United States Patent
Lardner et al.

(10) Patent No.: US 10,557,541 B2
(45) Date of Patent: Feb. 11, 2020

(54) DRY VARIABLE SPEED DRIVE MECHANISM

(71) Applicant: DEERE & COMPANY, Moline, IL (US)

(72) Inventors: Ethan D. Lardner, East Moline, IL (US); Nicole M. Gassman, Waterloo, IA (US); Lourens M. Jacobs, Cedar Falls, IA (US); Allan N. Schott, Reinbeck, IA (US)

(73) Assignee: DEERE & COMPANY, Moline, IL (US)

( * ) Notice: Subject to any disclaimer, the term of this patent is extended or adjusted under 35 U.S.C. 154(b) by 155 days.

(21) Appl. No.: 15/268,997

(22) Filed: Sep. 19, 2016

(65) Prior Publication Data

US 2018/0080539 A1    Mar. 22, 2018

(51) Int. Cl.
| | |
|---|---|
| *F16H 55/56* | (2006.01) |
| *B21D 53/26* | (2006.01) |
| *C21D 1/06* | (2006.01) |
| *C21D 1/18* | (2006.01) |
| *C21D 9/00* | (2006.01) |
| *C23C 26/00* | (2006.01) |

(52) U.S. Cl.
CPC ............. *F16H 55/56* (2013.01); *B21D 53/26* (2013.01); *C21D 1/06* (2013.01); *C21D 1/18* (2013.01); *C21D 9/0068* (2013.01); *C23C 26/00* (2013.01)

(58) Field of Classification Search
CPC ...... F16H 55/56; F16H 9/18; F16H 61/66272; F16H 63/067; F16H 9/16
USPC ............................................................ 474/8
See application file for complete search history.

(56) References Cited

U.S. PATENT DOCUMENTS

| | | | | |
|---|---|---|---|---|
| 1,350,670 | A * | 8/1920 | Ritter | F16H 9/16 474/29 |
| 1,952,884 | A * | 3/1934 | Nichols | F16H 55/49 474/8 |
| 2,013,268 | A * | 9/1935 | Douville | F16H 55/56 474/39 |
| 2,107,483 | A * | 2/1938 | Knight | F16H 9/14 474/26 |
| 2,210,300 | A * | 8/1940 | Magruder | B08B 9/045 15/104.33 |
| 2,253,612 | A * | 8/1941 | Dow | F16H 55/566 474/8 |

(Continued)

FOREIGN PATENT DOCUMENTS

AT    517594 A4    3/2017

OTHER PUBLICATIONS

Search Report and Written Opinion; 10 Pages.

*Primary Examiner* — Henry Y Liu
(74) *Attorney, Agent, or Firm* — Taft Stettinius & Hollister LLP; Stephen F. Rost

(57) ABSTRACT

A variable speed drive having a rotatable drive shaft, a fixed sheave fixed relative to the drive shaft and mounted for rotation with the drive shaft, a movable sheave mounted for axial movement relative to the drive shaft, a plurality of drive fingers projecting axially from one of the sheaves, each drive finger defining a finger contact, and a plurality of recesses in the other sheave, each drive finger being movably received by a corresponding one of the recesses, and each recess defining a recess contact that slidably engages the corresponding finger contact.

20 Claims, 12 Drawing Sheets

(56) References Cited

U.S. PATENT DOCUMENTS

| | | | | |
|---|---|---|---|---|
| 2,376,154 A * | 5/1945 | Kershaw | ............... | F16H 55/48 29/37 R |
| 2,769,345 A * | 11/1956 | Bugenhagen | ............ | F16H 9/16 474/29 |
| 3,200,661 A * | 8/1965 | Chambers | ............... | F16H 55/52 474/8 |
| 3,375,738 A | 4/1968 | Love | | |
| 3,961,538 A * | 6/1976 | Phillips | ................... | F16H 55/56 474/46 |
| 4,398,899 A * | 8/1983 | Wood | ...................... | F16H 55/56 474/37 |
| 4,504,022 A * | 3/1985 | Stang | ..................... | B65H 51/06 226/175 |
| 5,468,191 A * | 11/1995 | Monahan | .............. | F16H 55/563 474/47 |
| 6,648,781 B1 * | 11/2003 | Fischer | .................. | F16H 55/56 474/201 |
| 6,755,759 B2 * | 6/2004 | Blanchard | ................ | F16H 9/18 474/19 |
| 6,953,400 B2 * | 10/2005 | Kalies | .................... | F16H 55/56 472/10 |
| 7,001,293 B2 * | 2/2006 | Lubben | ................... | F16C 25/06 384/519 |
| 7,081,057 B2 * | 7/2006 | Kalies | .................... | F16H 55/56 474/19 |
| 7,217,204 B2 * | 5/2007 | Roby | ...................... | F16H 55/56 474/12 |
| 7,351,169 B2 * | 4/2008 | Jonckheere | ........ | A01D 41/1274 474/18 |
| 7,361,108 B2 * | 4/2008 | Haas | ........................ | F16H 9/18 474/20 |
| 7,988,796 B2 * | 8/2011 | Ohbayashi | .............. | B23P 15/00 148/223 |
| 9,021,725 B2 * | 5/2015 | Stalker | .................. | E02F 9/2016 37/395 |
| 9,518,640 B2 * | 12/2016 | Jacobs | ...................... | F16H 9/08 |
| 2001/0034280 A1 * | 10/2001 | Kuga | ....................... | F16H 9/18 474/8 |
| 2002/0155909 A1 * | 10/2002 | Roby | ..................... | F16H 55/56 474/14 |
| 2006/0105867 A1 * | 5/2006 | Reuschel | .................. | F16H 9/18 474/18 |
| 2007/0015616 A1 * | 1/2007 | Teijido | .................... | F16H 55/56 474/19 |
| 2007/0155550 A1 * | 7/2007 | Faust | ...................... | F16H 55/56 474/8 |
| 2008/0099107 A1 * | 5/2008 | Ohbayashi | .............. | B23P 15/00 148/226 |
| 2008/0268991 A1 * | 10/2008 | Walter | ...................... | C21D 1/10 474/12 |
| 2008/0280714 A1 * | 11/2008 | Gerlich | ................... | F16D 1/108 474/153 |
| 2009/0280936 A1 * | 11/2009 | Appleton | ................ | F02B 67/06 474/8 |
| 2011/0092324 A1 * | 4/2011 | Roby | ...................... | F16H 55/56 474/8 |
| 2015/0226291 A1 * | 8/2015 | Jacobs | .................... | F16H 55/56 474/8 |

* cited by examiner

DRY VARIABLE SPEED DRIVE MECHANISM

FIELD OF THE DISCLOSURE

The present disclosure relates to a variable speed drive mechanism.

BACKGROUND OF THE DISCLOSURE

Current variable speed drives typically include a fixed sheave and a movable sheave which is coupled by splines to a drive shaft. This splined connection must be routinely maintained with a lubricant such as oil or grease. The translational movement of the parts requires seals to contain the lubricant along the splined interface. When the lubricant leaks through the seals the loss of lubricant causes premature spline wear. Further, leaking lubricant often contacts one or more V-belts causing premature belt wear.

Other variable speed fan drives utilize drive fingers in one of the sheaves and corresponding recesses in the other sheave to rotatably couple the fixed sheave to the movable sheave. The drive fingers have a wear member positioned between the drive finger and the recess.

Variable speed fan drives implementing either the lubricated splines or the wear members require maintenance and monitoring to ensure that the fixed sheave and the movable sheave properly engage one another or the drive shaft.

SUMMARY

One embodiment of the present disclosure is a variable speed drive having a rotatable drive shaft, a fixed sheave fixed relative to the drive shaft and mounted for rotation with the drive shaft, a movable sheave mounted for axial movement relative to the drive shaft, a plurality of drive fingers projecting axially from one of the sheaves, each drive finger defining a finger contact, and a plurality of recesses in the other sheave, each drive finger being movably received by a corresponding one of the recesses, and each recess defining a recess contact that slidably engages the corresponding finger contact.

Another embodiment is a variable drive having a rotatable drive shaft, a fixed sheave fixed axially relative to the drive shaft and mounted for rotation with the drive shaft, a movable sheave mounted for axial movement relative to the drive shaft, a plurality of drive fingers projecting from one of the sheaves, each finger defining a finger contact, and a plurality of recesses in the other sheave, each recess defining a recess contact. Wherein each drive finger is movably received by a corresponding one of the recesses, and the finger contact slidably engages the corresponding recess contact. Further wherein at least one of the finger contact or the recess contact is hardened through a surface treatment.

Another embodiment is a method of manufacturing a fixed sheave and a movable sheave for a variable speed drive including forming a first sheave by shaping a first material to define a first belt engaging flange and at least one drive finger defining a finger contact, forming a second sheave by shaping a second material to define a second belt engaging flange and at least one recess defining a recess contact, hardening the first or second material of the respective finger contact or recess contact through a surface treatment, fixing one of the sheaves to a drive shaft and positioning the other of the sheaves about the drive shaft, and positioning at least a portion of the drive finger within the recess where the finger contact slidably engages the recess contact.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
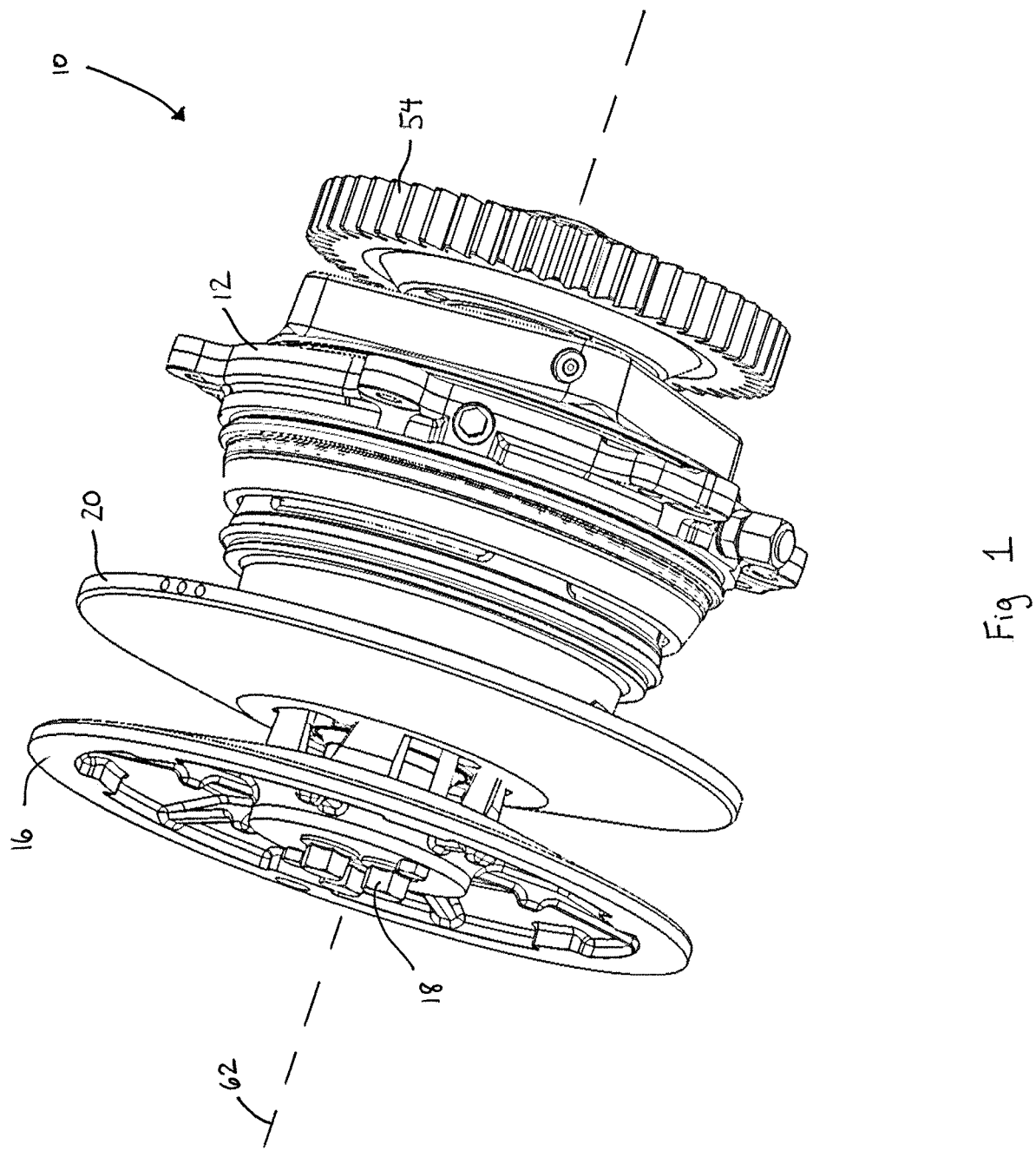
FIG. 1 is an elevated perspective view of a variable belt drive assembly.
Figure 2:
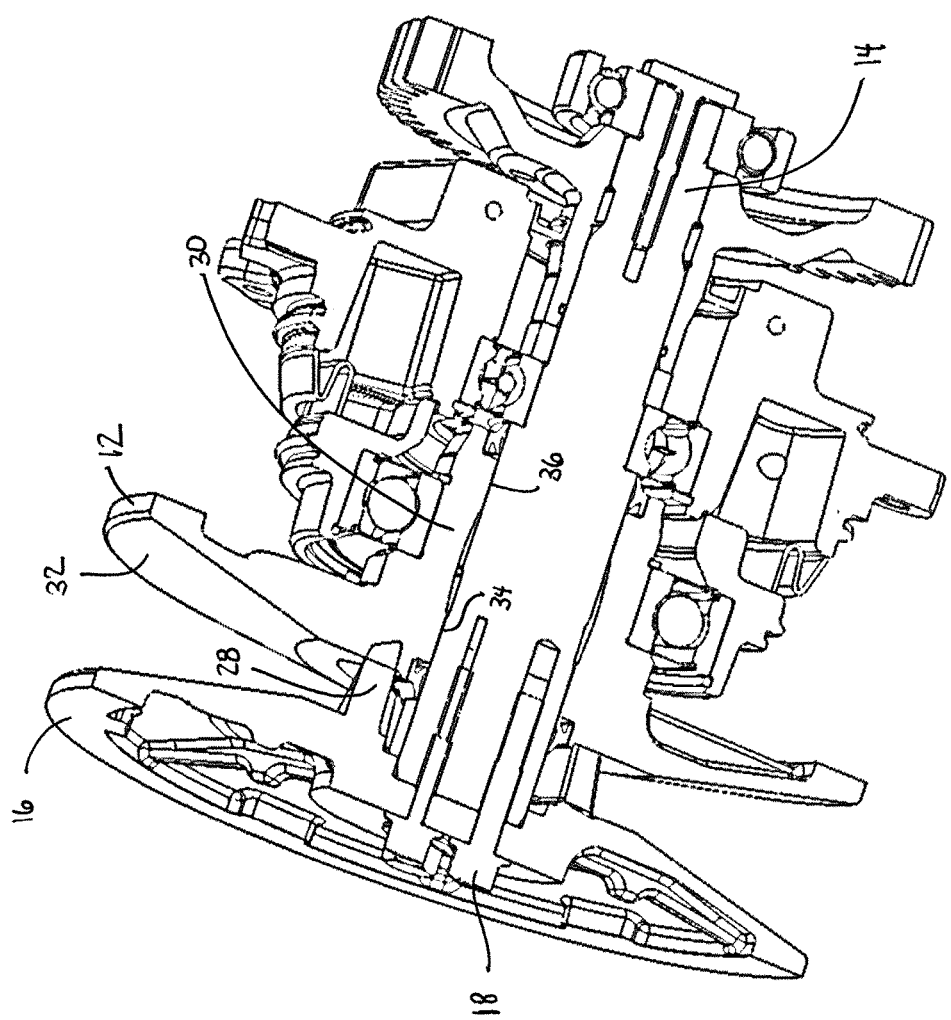
FIG. 2 is a cross-sectional view of the variable belt drive assembly of FIG. 1.

Referring to FIGS. 1 and 2, one embodiment of a variable speed belt drive 10 is shown. The variable speed belt drive 10 may include a housing 12 which supports a rotating drive shaft 14. A fixed sheave 16 may be fixed to one end of the drive shaft 14, such as by bolts 18, and a drive gear 54 may be coupled to another end of the drive shaft 14 opposite the fixed sheave 16. The fixed sheave 16 is thereby mounted for rotation with the drive gear 54 and drive shaft 14 about an axis 62 defined through the drive shaft 14. A movable sheave 20 may be mounted for axial movement relative to the drive shaft 14. The movable sheave 20 may be rotationally fixed to the drive shaft 14 through the fixed sheave 16 via one or more drive finger 28 as described in more detail below.

Figure 3:
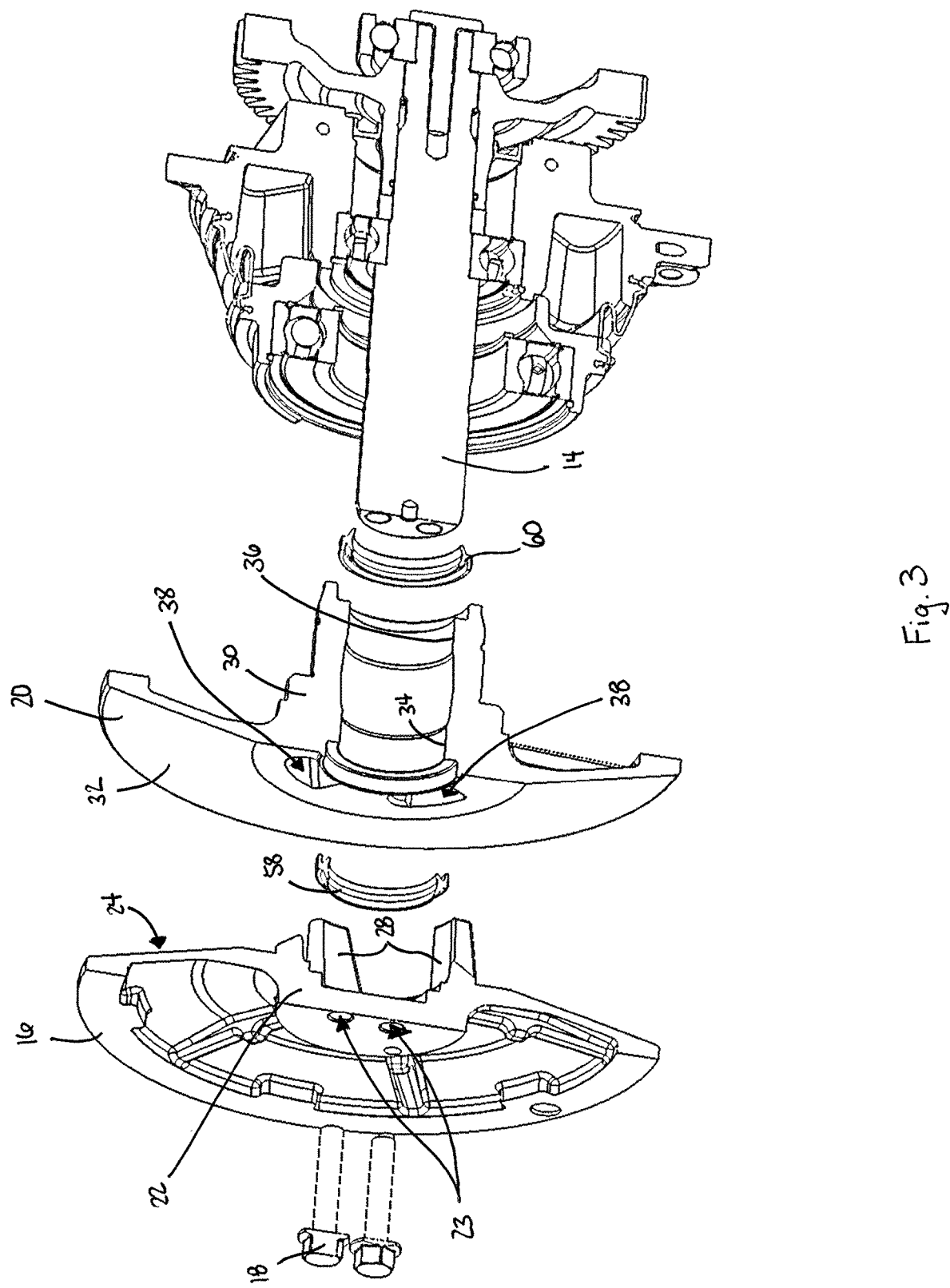
FIG. 3 is an expanded view of the variable belt drive assembly of FIG. 1.

Referring now to FIG. 3, the fixed sheave 16 includes a central hub 22 which has bolt receiving bores 23 extending therethrough and a belt-engaging flange 24 which surrounds the hub 22. The drive fingers 28 project axially from the fixed sheave 16 and towards the movable sheave 20.

The movable sheave 20 includes a hollow axially extending central hub 30 and a belt-engaging flange 32 which surrounds the hub 30. The hub 30 forms a first and second bearing member 34 and 36 which receive the shaft 14. The hub 30 also includes a plurality of spaced apart recesses 38.

The recesses 38 are open in a direction facing the fixed sheave 16, and extend axially into the hub 30 and away from the fixed sheave 26.

Each drive finger 28 is movably received by a corresponding one of the recesses 38. More specifically, the fixed sheave 16 may be fixedly coupled to the drive shaft 14 through the one or more bolts 18. In this configuration, as the drive shaft 14 rotates, the fixed sheave 16 may also rotate because it is fixedly coupled thereto.

In one embodiment, a prime mover may apply a torque to the drive gear 54. The drive gear 54 may be splined or otherwise coupled to the drive shaft 14 and transfer the applied torque from the prime mover through the drive shaft 14 and into the fixed sheave 16. The fixed sheave 16 may transfer the torque to the movable sheave 20 through contact between the drive fingers 28 and the recesses 38.

One aspect of the present disclosure is the ability of the movable sheave 20 to slide axially along the drive shaft 14 relative to the fixed sheave 16 while rotating therewith. In other words, the movable sheave 20 may be axially spaced from the fixed sheave 16 several different distances along the drive shaft 14 while still allowing sufficient torque transfer through the drive fingers 28 and recesses 38 to rotate the movable sheave 20 with the fixed sheave 16. In this embodiment, the drive fingers 28 may engage the recesses 38 at a finger contact 56 (see FIG. 4) and the central hub 30 may contact the drive shaft 14 at the respective bearing members 34, 36. The finger contact 56 may be surface of the drive finger 28 that engages a corresponding portion of the recess 38 when torque is applied to the fixed sheave 16. Accordingly, the movable sheave 20 may contact the drive shaft 14 at the respective bearing members 34, 36, and the fixed sheave 16 at the respective finger contacts 56, as the movable sheave 20 moves axially along the drive shaft 14.

The central hub 30 may also have a first seal 58 and a second seal 60 positioned on each end of the central hub 30. The first and second seal 58, 60 may substantially restrict debris from entering the space between the drive shaft 14 and the central hub 30. More specifically, the respective seal 58, 60 may extend from the central hub 30 or other portion of the movable sheave 20 and contact the outer surface of the drive shaft 14. In this configuration, as the movable sheave 20 moves along the drive shaft 14, the respective seals 58, 60 slide along the outer surface of the drive shaft 14, thereby removing any debris that may be positioned thereon. In one aspect of the present embodiment, the seals 58, 60 may substantially restrict debris from becoming positioned between the respective bearing members 36, 40.

While the embodiment shown herein displays the first and second seals 58, 60 coupled to the central hub 30, this disclosure is not limited to having any seals at all. More specifically, the movable hub 20 may not have the first and second bearing members 34, 36 at all. Rather, the central hub 30 may have an inner diameter that is larger than an outer diameter of the drive shaft 14. In this configuration, there may be a space between the outer surface of the drive shaft 14 and the inner surface of the central hub 30. The spacing between the drive shaft 14 and the central hub 30 may be sufficient to allow debris to be positioned therebetween without substantially affecting the axial movement of the movable sheave 20 relative to the fixed sheave 16.

Figure 4:
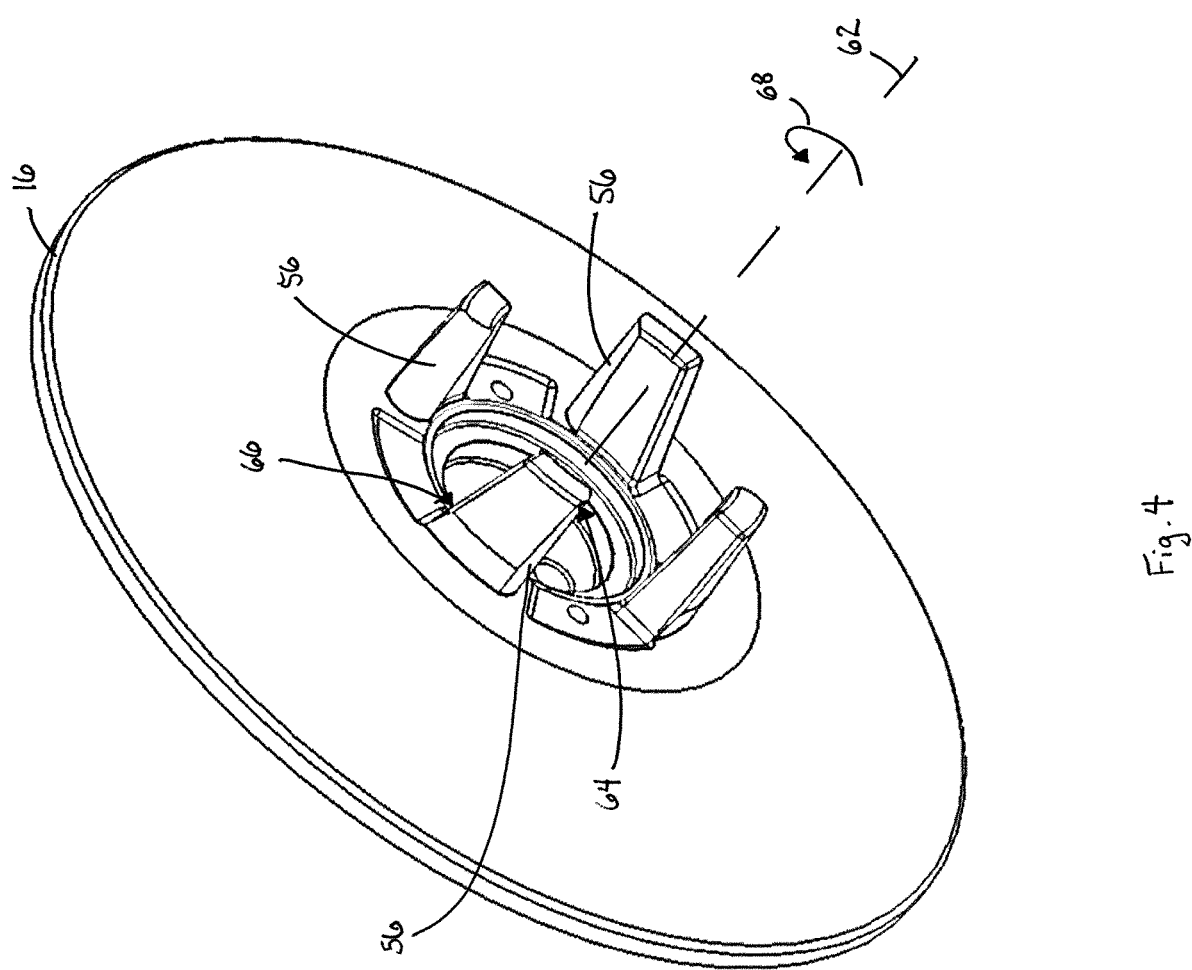
FIG. 4 is an isolated perspective view of a fixed sheave.

Referring now to FIG. 4, one non-exclusive arrangement of drive fingers 28 is shown. In the embodiment shown in FIG. 4, four drive fingers 28 may be shown spaced radially about the axis 62. Each of the drive fingers 28 may extend axially from the fixed sheave 16 and defined a leading edge 64 and a trailing edge 66. The leading edge 64 may be the edge of the respective drive finger 28 that leads as the fixed sheave 16 rotates with the drive shaft 14. In one non-limiting example, the fixed sheave 16 shown in FIG. 4 may be designed to rotate in a counterclockwise direction 68 relative to the perspective shown in FIG. 4. Accordingly, when the drive fingers 28 are positioned within the respective recesses 38 and torque is applied to the fixed sheave 16, said torque may be substantially transferred to the movable sheave 20 through the finger contact 56 of the respective drive fingers 28. In this configuration, the finger contact 56 may be the only portion of the fixed sheave 16 and drive shaft 14 that substantially transfers torque to the movable sheave 20.

Figure 5:
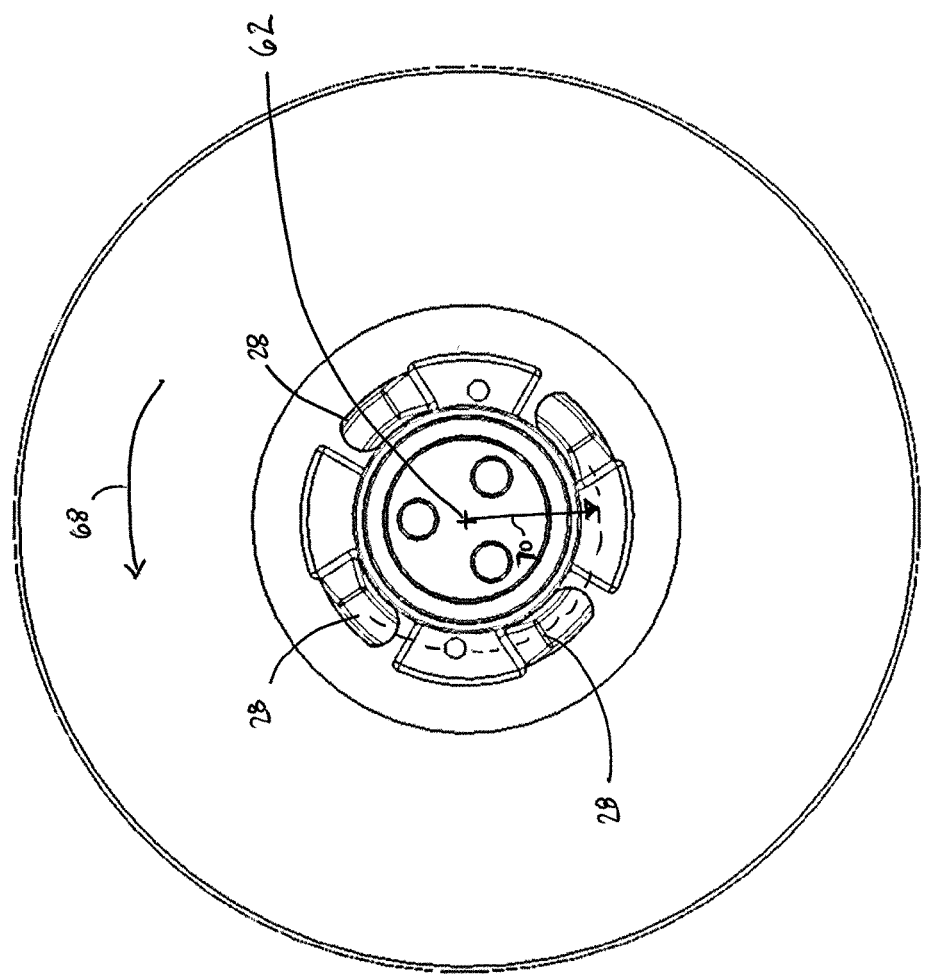
FIG. 5 is a top view of the fixed sheave if FIG. 4.

Now referring to FIG. 5, the radial positioning of each drive finger 28 is more clearly shown. More specifically, each drive finger 28 may be positioned along a first radius 70 from the axis 62. Further, each drive finger 28 may have a substantially arc-shaped profile between the respective leading and trailing edge 64, 66. The substantially arc-shaped profile of the drive fingers 28 may have a radius equal to, or about equal to, the first radius 70. The arc-shaped profile of the drive fingers 28 may allow the drive fingers 28 to freely move within the corresponding recesses 38 until the finger contact 56 engages the corresponding portion of the recess 38. In other words, the arc-shaped profile of the drive fingers 28 may define an arc axis that is coaxial with the axis 62 about which the sheaves 16, 20 rotate. Accordingly, the drive fingers 28 of the fixed sheave 16 will not bind or otherwise engage the movable sheave 20 until the finger contact 56 of the leading edge 64 engages the corresponding surface of the recess 38 when moved in the counter-clockwise direction 68.

Figure 6:
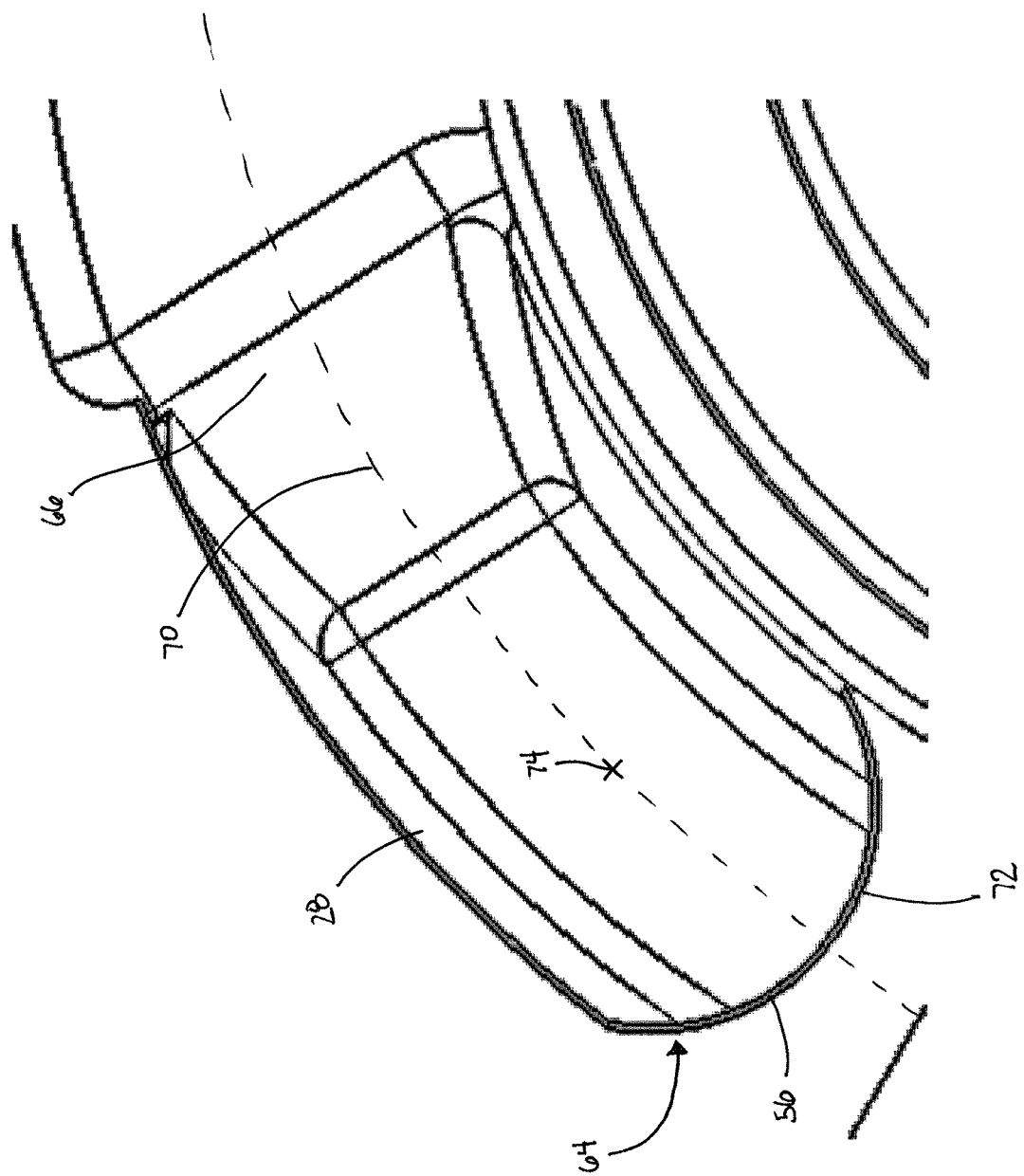
FIG. 6 is an isolated top view of a finger from the fixed sheave of FIG. 4.
Figure 7:
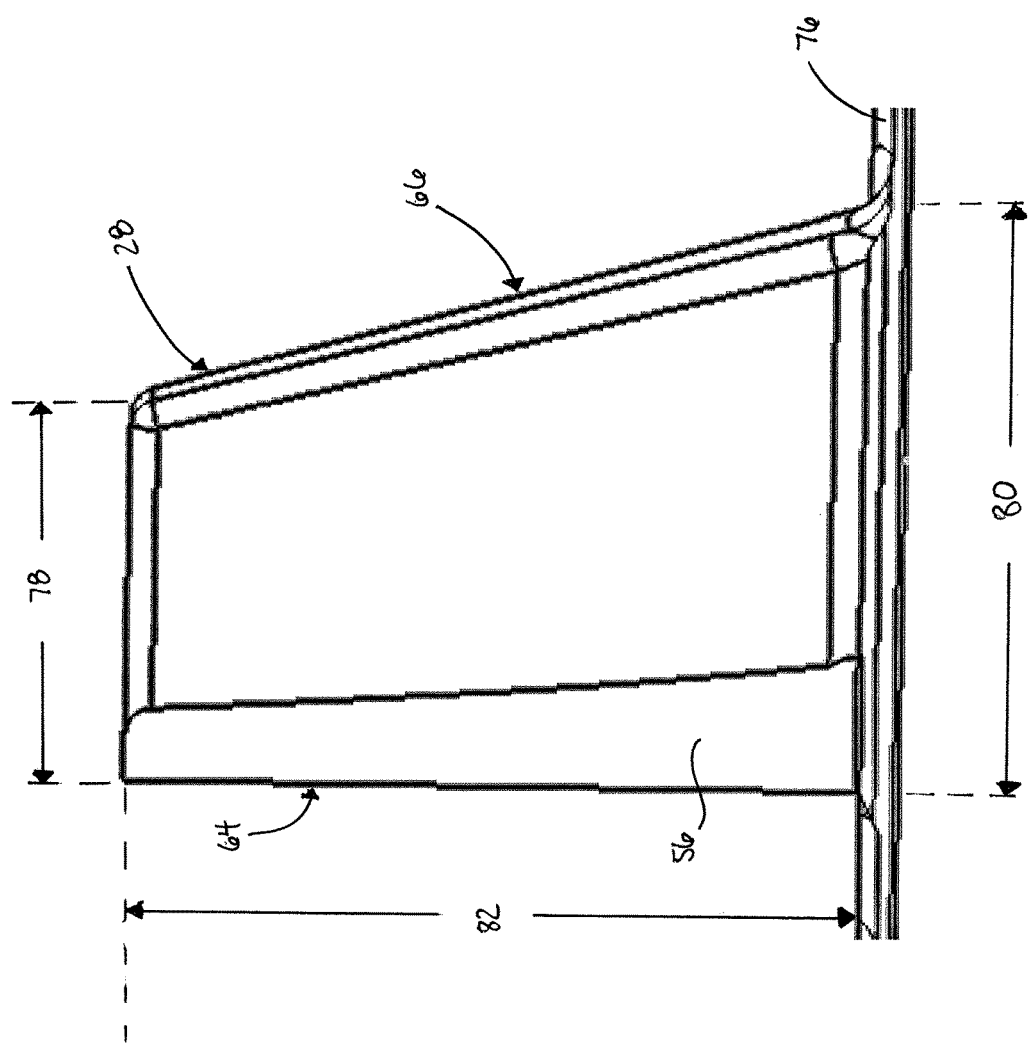
FIG. 7 is an isolated side view of the finger from FIG. 6.

Referring now to FIG. 6, an enlarged isolated view of one of the drive fingers 28 is shown. More specifically, a leading edge profile 72 is shown at the finger contact 56. In the embodiment shown in FIG. 6, the leading edge profile 72 is substantially arc-shaped. The arc-shape of the leading edge profile 72 may be defined about a leading edge axis 74. Further, the leading edge axis 74 may be defined on, or in close proximity to, the first radius 70. In this embodiment, the leading edge profile 72 may increase the surface area of the finger contact 56 compared to a substantially straight leading edge profile 72. In one non-exclusive example of the present disclosure, increasing the surface area of the finger contact 56 may allow a better wear-rate of the finger contact 56. Further, by positioning the leading edge axis 74 proximate to the first radius 70, the arc-shaped leading edge profile 72 may be oriented to apply torque in the counter-clockwise direction of rotation 68.

While an arc-shaped leading edge profile 72 has been shown and described above, this disclosure is not limited to such an embodiment. Further, while the arc-shaped leading edge profile 72 has been compared to a straight leading edge profile 72, one embodiment of the present disclosure may utilize a straight leading edge profile 72 instead of the arc-shaped leading edge profile 72 shown in FIG. 6. Further still, any other leading edge profile 72 is also considered herein. In other embodiments, the leading edge profile 72 may be partially triangular, oval, octagonal, or the like in shape. A person having skill in the relevant art understands other leading edge profiles may be used in view of this disclosure.

The trailing edge 66 of the drive finger 28 may be slanted relative to a base portion 76 of the fixed sheave 16. In one embodiment, the drive finger 28 may have a top width 78 that is less than a bottom width 80. The leading edge 64 may be substantially perpendicular to the base portion 76 while the slanted trailing edge 66 extends a height 82 of the drive finger 28 between the base width 80 and the top width 78. The slanted trailing edge 66 and the overall dimensions of the drive finger 28 may be sufficiently sized to transfer torque from the fixed sheave 16 to the movable sheave 20 without shearing or otherwise deforming the drive finger 28. Accordingly, while the trailing edge 66 has been shown and described as slanted, such a configuration is not limiting. In other embodiments the trailing edge 66 may be perpendicular to the base portion 76. Accordingly, many different orientations for the trailing edge 66 are considered and no specific orientation is limiting.

Figure 8:
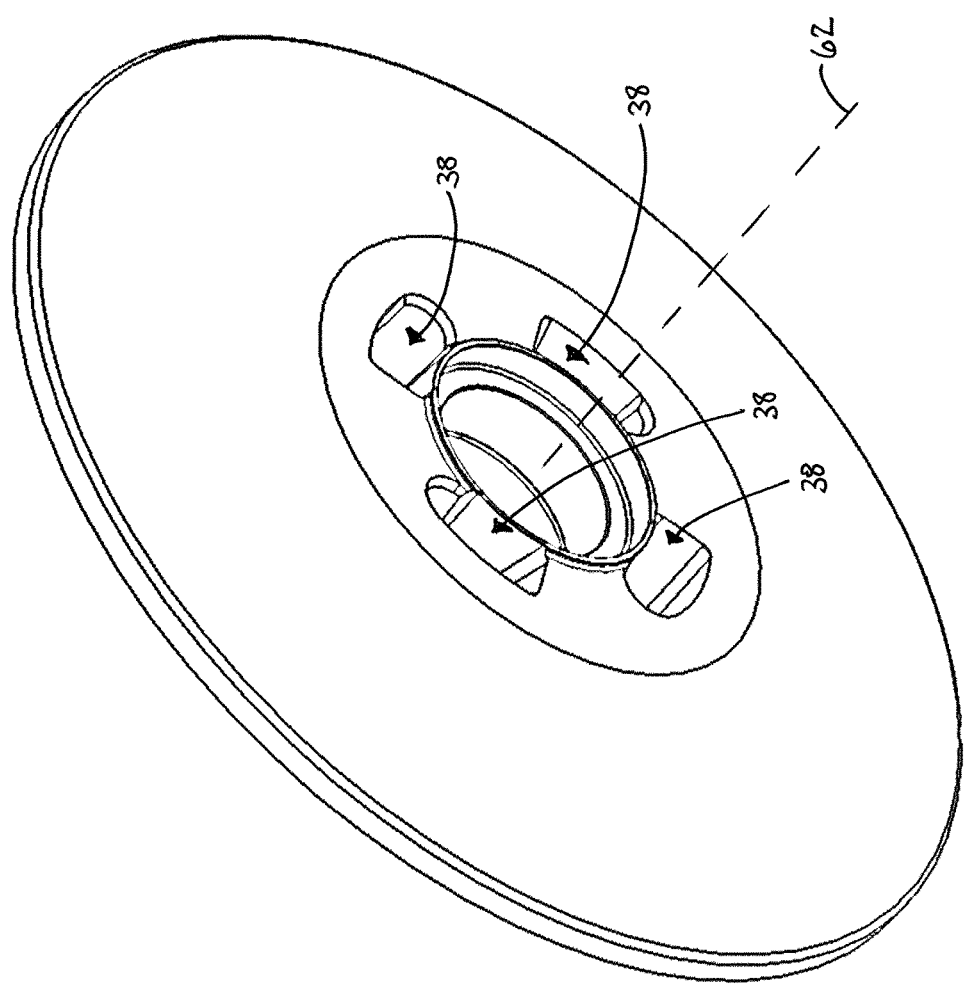
FIG. 8 is an isolated perspective view of a movable sheave.

Referring now to FIG. 8, a perspective view of the movable sheave 16 is shown. More particularly, the recesses 38 are shown spaced radially about the axis 62. In the non-exclusive embodiment of FIG. 8, four recesses 38 are shown to correspond with the four drive fingers 28 of FIG. 4. However, this disclosure is not limited to any particular number of recesses 38 or drive fingers 28. In other embodiments, there may be only one recess 38 that corresponds with only one drive finger 28. In another embodiment, there may be more than ten recesses 38 that correspond with more than ten drive fingers 28. Accordingly, the particular number of drive fingers 28, and recesses 38 is not limiting.

Figure 9:
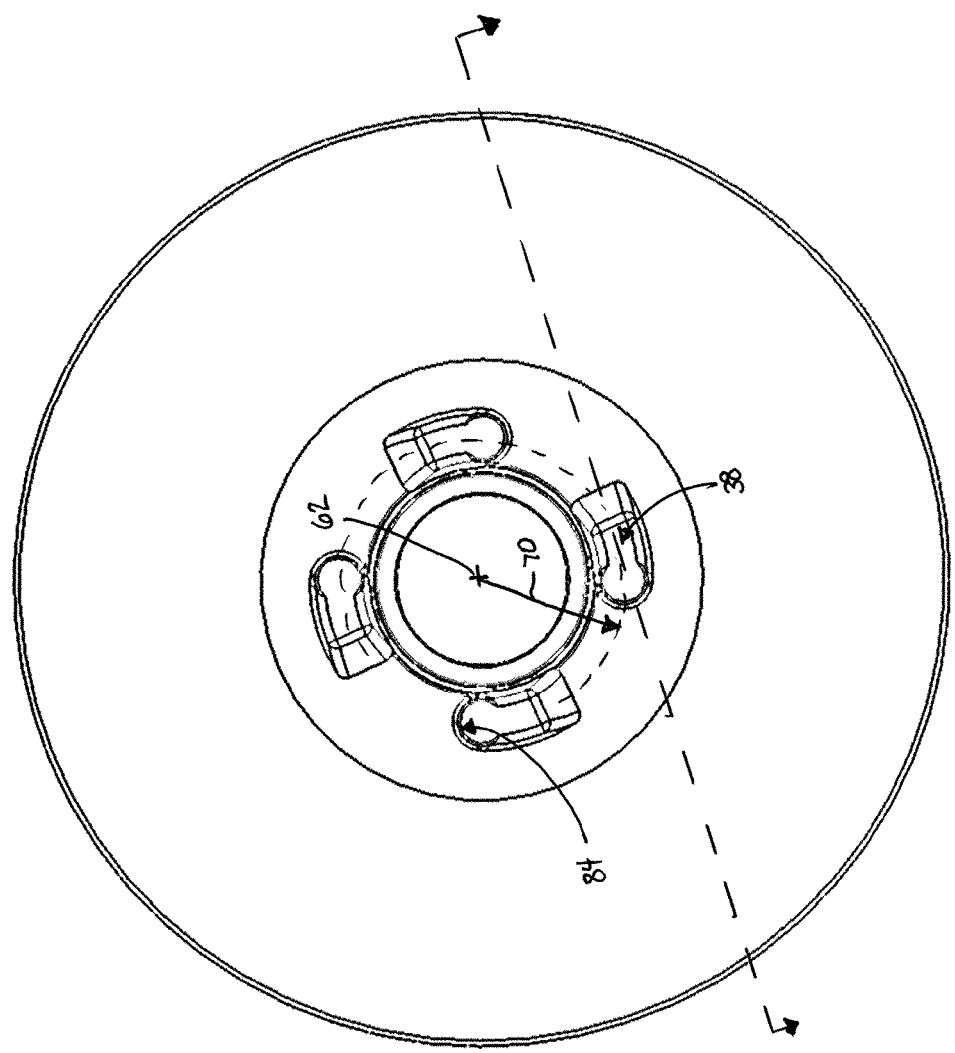
FIG. 9 is a top view of the movable sheave from FIG. 8.

The radial spacing of the recesses 38 may be substantially similar to the radial spacing of the drive fingers 28 as illustrated in FIG. 9. More specifically, each recess 38 may have an arc-shaped profile that is defined along an arc of the first radius 70. Further, the recesses 38 may each define a leading edge 84 and a trailing edge 86. The leading edge 84 and the trailing edge 86 of the recess 38 may correspond with the leading edge 64 and the trailing edge 66 of the respective drive finger 28 when the drive finger 28 is positioned at least partially within the recess 38.

Figure 10:
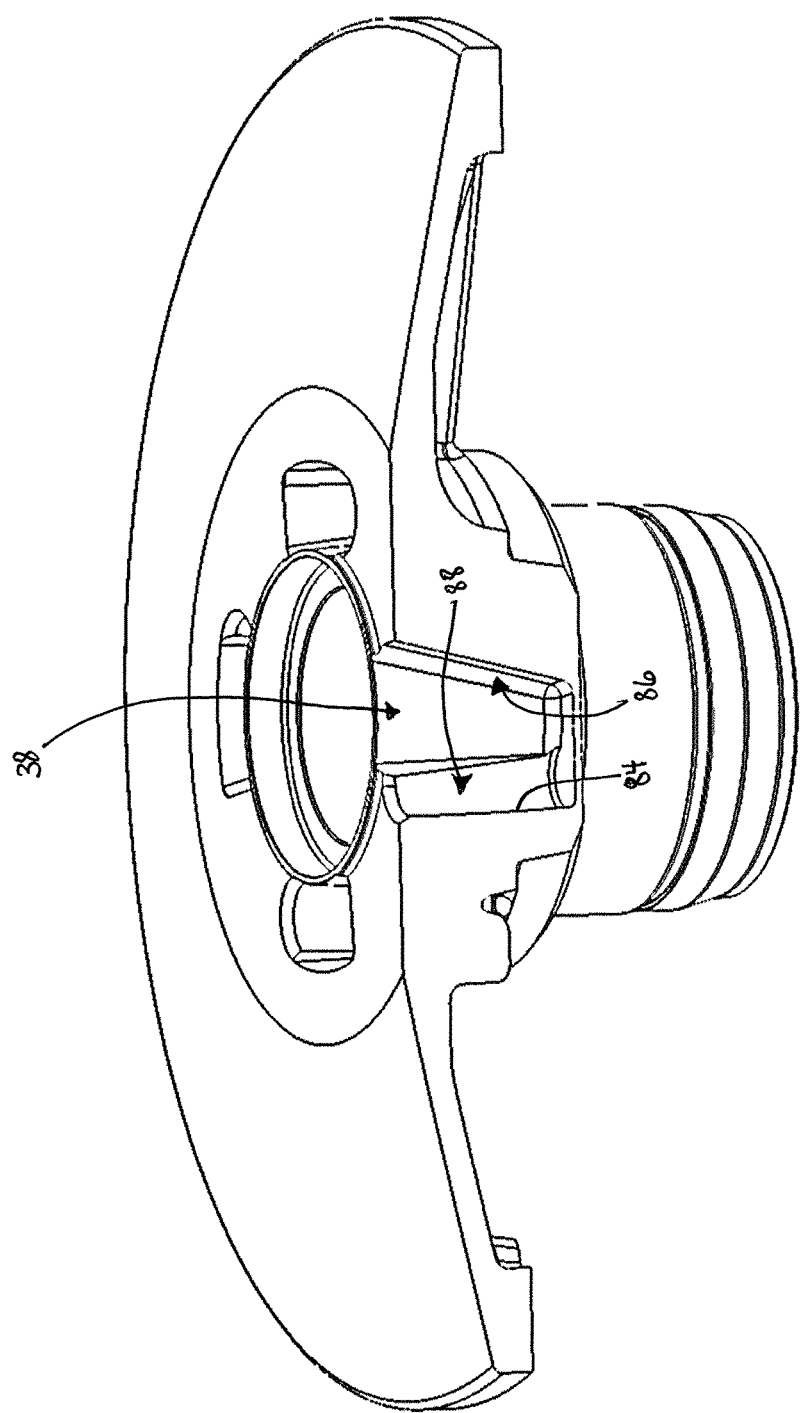
FIG. 10 is a section view through a recess of the movable sheave from FIG. 8.

A side profile section view of the recess 38 is shown in FIG. 10. More specifically, the leading edge 84 and trailing edge 86 of the recess 38 are more clearly illustrated in FIG. 10. The leading edge 84 of the recess 38 is sized to receive the leading edge 64 of the respective drive finger 28. Further still, the leading edge 84 of the recess 38 may define a recess contact 88 that may engage the finger contact 56 of the drive finger 28. The recess contact 88 may be a surface of the recess 38 where the drive finger 28 contacts the recess 38 when torque is transferred from the fixed sheave 16 to the movable sheave 20. Accordingly, torque may be transferred from the fixed sheave 16 to the movable sheave 20 through engagement of the finger contact 56 and the recess contact 84.

Figure 11:
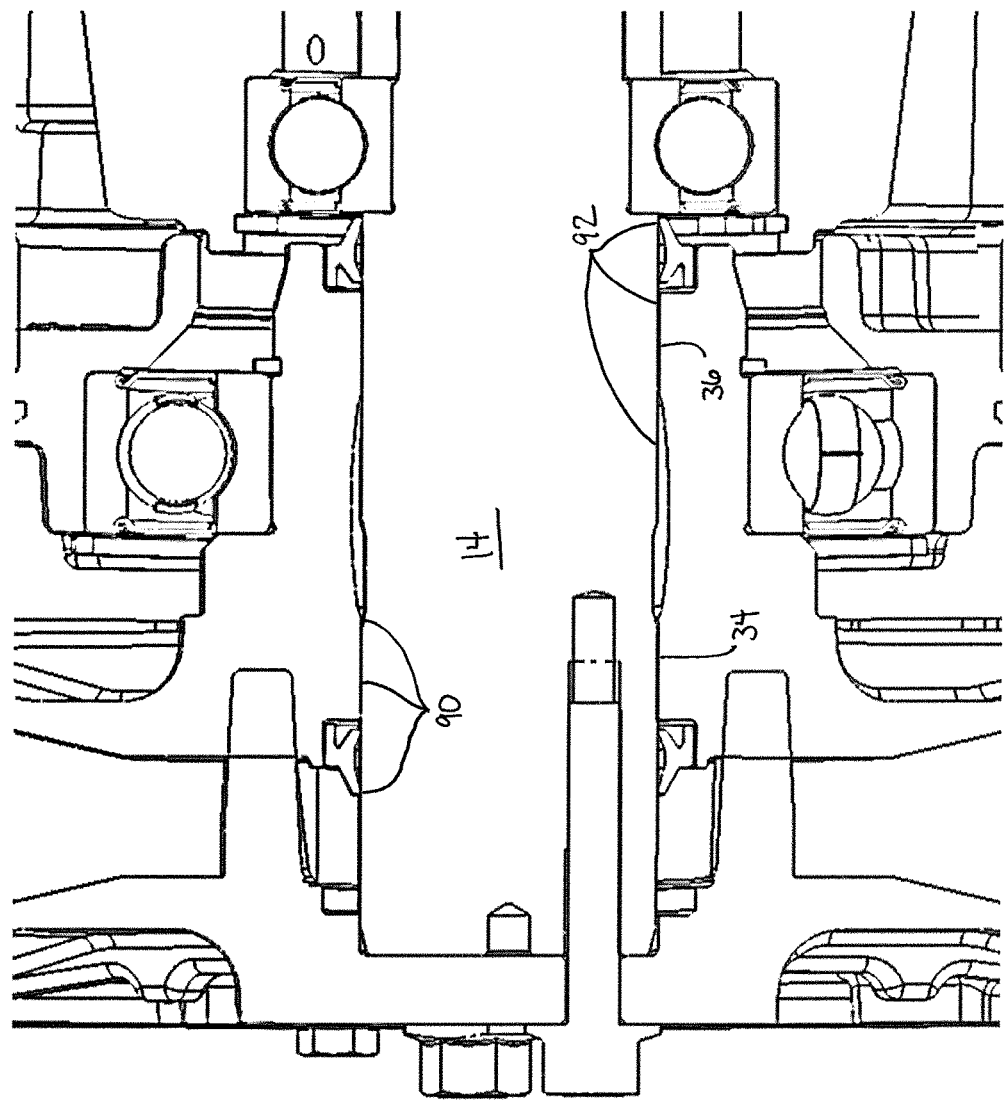
FIG. 11 is a section view of the variable belt drive assembly of FIG. 1.
Figure 12:
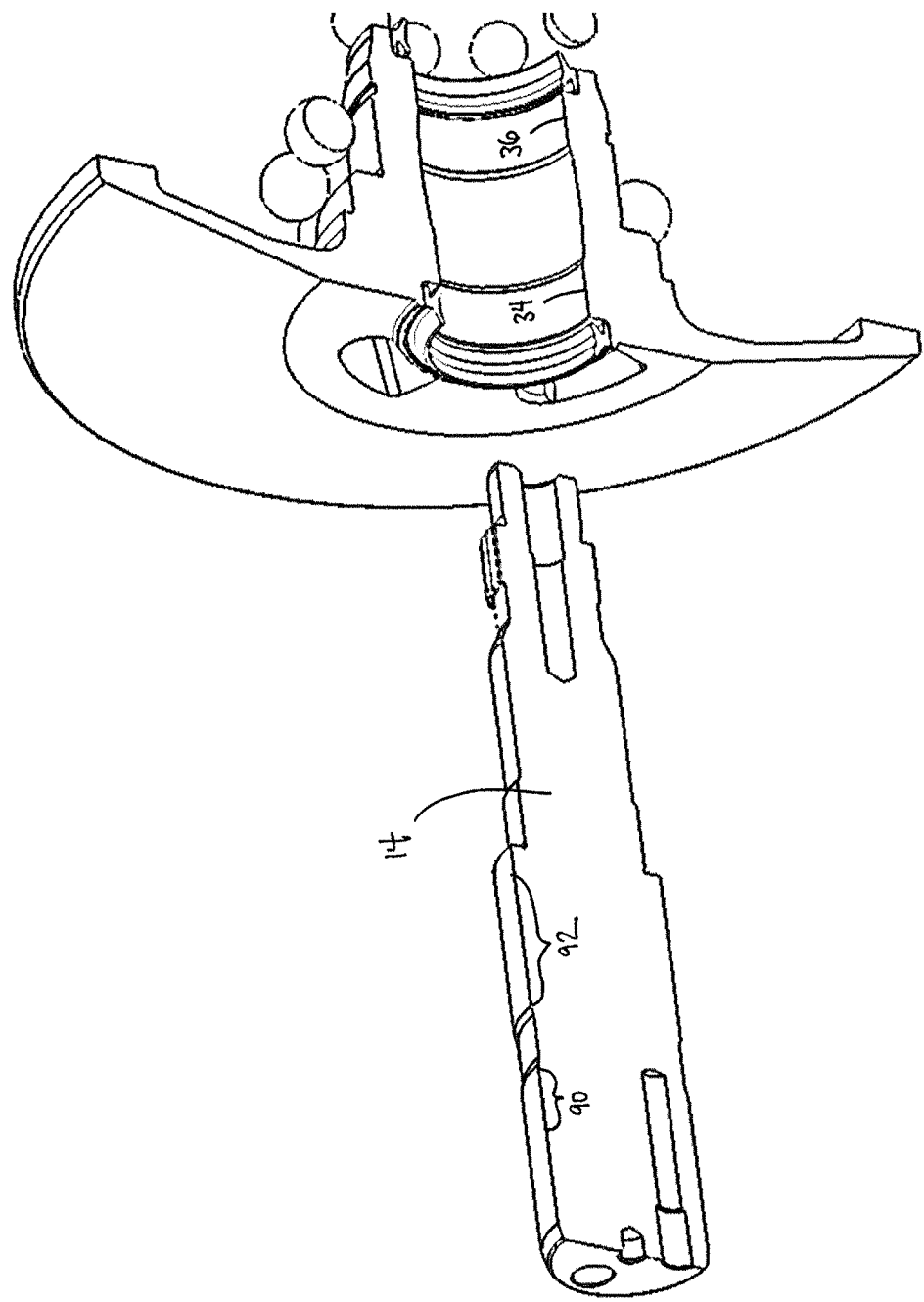
FIG. 12 is an expanded section view of a shaft and the movable sheave.

Referring now to FIGS. 11 and 12, a first and second shaft contact 90, 92 are shown. The first and second shaft contact 90, 92 may be the areas along the outer surface of the drive shaft 14 that may contact the first and second bearing member 34, 36 of the movable sheave 20. In the embodiment shown and described herein, the movable sheave 20 may move axially along the drive shaft 14 to adjust the variable speed belt drive 100. During axial movement, the movable sheave 20 may slide axially along, or proximate to, the drive shaft 14 towards or away from the fixed sheave 16. Further still, the movable sheave 20 may move between a minimum axial distance from the fixed sheave 16 (minimum axial distance not shown), to a maximum axial distance from the fixed sheave 16 as shown in FIG. 11.

The portion of the outer surface of the drive shaft 14 positioned adjacent to the respective first and second bearing members 34, 36 may vary depending on the axial location of the movable sheave 20 relative to the fixed sheave 20. Accordingly, the first and second shaft contacts 90, 92 may have an axial width greater than a width of the first and second bearing members 34, 36 to ensure that the first and second bearing members 34, 36 are positioned proximate to the respective first and second shaft contacts 90, 92 regardless of the axial position of the movable sheave 20 relative to the fixed sheave 16.

In one embodiment, the first and second bearing members 34, 36 and the corresponding first and second shaft contact 90, 92 may substantially contact one another. In this configuration, as the movable sheave 20 slides axially along the drive shaft 14, the first and second bearing members 34, 36 slide along the outer surface of the drive shaft 14 along the first and second shaft contact 90, 92.

However, in a different embodiment the bearing members 34, 36 may not substantially contact the drive shaft 14 regardless of the axial position of the movable sheave 20 relative to the fixed sheave 16. In this embodiment, the bearing members 34, 36 may be spaced from the outer surface of the drive shaft 14 and thereby not directly contact the drive shaft 14. In this configuration, there may be no bearing members 34, 36 defined in the movable sheave 20 at all. Further, the drive shaft 14 may not have the first and second shaft contact 90, 92 positioned thereon. In other words, in an embodiment where the movable sheave 20 does not substantially directly contact the drive shaft 14, the bearing members 34, 36 and shaft contacts 90, 92 may not be necessary.

In one aspect of the present disclosure, the material positioned along the finger contact 56 and the recess contact 88 may be configured to engage one another and transfer torque from the fixed sheave 16 to the movable sheave 20 without requiring additional lubricants or other material. More specifically, in one embodiment the fixed sheave 16 and the movable sheave 20 may be made from a material that can be hardened. In one embodiment, a surface treatment may be performed on at least the finger contact 56 and the recess contact 88 to harden the respective surfaces. Any form of surface treatment, such as heat treatment or case-hardening, may be used at the finger contact 56 and the recess contact 88 to improve the wear life of the respective surfaces 56, 88 during use. In one embodiment, the finger contact 56 and the recess contact 88 may be formed of austempered ductile iron. In this embodiment, the austempering of the finger contact 56 and the recess contact 88 may form a surface that has increased wear resistance. By hardening the finger contact 56 and the recess contact 88, wear life of the respective contacts 56, 88 may be improved without requiring additional maintenance steps such as adding grease or other lubricants to the contacts 56, 88.

While austempering ductile iron has been described as a surface treatment method for hardening the finger contact 56 and the recess contact 88, this disclosure is not limited to such a method. Any form of heat treating, case or surface hardening, laser hardening, or the like may be used on the finger contact 56 and the recess contact 88.

Similarly, in the embodiment where the first and second bearing members 34, 36 contact or are positioned proximate to the first and second shaft contacts 90, 92, a hardening surface treatment may be performed on the bearing members 34, 36 and the shaft contacts 90, 92. By hardening the surface of the bearing member 34, 36 and the shaft contacts 90, 92, those surfaces may not require grease or other lubricants while still resisting wear.

In one embodiment, the fixed sheave 16 and the movable sheave 20 may be cast parts. In this embodiment, after the fixed sheave 16 and movable sheave 20 are cast, a machining process may execute additional forming steps to the fixed sheave 16 and movable sheave 20. After the fixed sheave 16 and movable sheave 20 are in the proper form, a hardening process may be performed to the finger contact 56 and the recess contact 88. Alternatively, in another embodiment the hardening process may be performed to the entire fixed sheave 16 and movable sheave 20. The hardening process may be at least any of the hardening processes described above but is not limited to only those hardening processes. Any process known to a person having skill in the relevant art is considered for generating a harder surface of the finger contact 56 and the recess contact 88 and this disclosure is not limited to any particular hardening process.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A variable speed drive comprising:
a rotatable drive shaft;
a fixed sheave fixed relative to the drive shaft and mounted for rotation with the drive shaft;
a movable sheave mounted for axial movement relative to the drive shaft;
a plurality of drive fingers projecting axially from one of the sheaves, each drive finger being a single piece of material and defining a finger contact; and
a plurality of recesses in the other sheave, each recess having a single substantially planar opening and each drive finger being movably received by a corresponding one of the recesses, and each recess defining a recess contact that slidably engages the corresponding finger contact.

2. The variable drive assembly of claim 1, wherein the finger contact is formed of a material that is hardened through a surface treatment.

3. The variable drive assembly of claim 1, wherein the recess contact is formed of a material that is hardened through a surface treatment.

4. The variable drive assembly of claim 1, wherein both the finger contact and the recess contact are formed of a material that is hardened through a surface treatment.

5. The variable drive assembly of claim 4, wherein the surface treatment is a heat treatment such as quenching, tempering, case hardening, or laser hardening.

6. The variable drive assembly of claim 1, wherein at least one of the finger contact or the recess contact are formed of a material that is hardened through austempering.

7. The variable drive assembly of claim 1, wherein the finger contact includes an arc-shaped leading edge profile which engages a corresponding surface of the corresponding recess.

8. The variable drive assembly of claim 1, further wherein each of the plurality of drive fingers have a leading edge and a trailing edge, wherein the finger contact is defined on the leading edge and the trailing edge is slanted relative to the leading edge.

9. The variable drive assembly of claim 1, further wherein each of the plurality of recesses have a leading edge and a trailing edge, wherein the recess contact is defined on the leading edge and the trailing edge is slanted relative to the leading edge.

10. A variable drive comprising:
a rotatable drive shaft;
a fixed sheave fixed axially relative to the drive shaft and mounted for rotation with the drive shaft;
a movable sheave mounted for axial movement relative to the drive shaft;
a plurality of drive fingers projecting from one of the sheaves, each finger being a single piece of material and defining a finger contact; and
a plurality of recesses in the other sheave, each recess having a single substantially planar opening and defining a recess contact;
wherein each drive finger is movably received by a corresponding one of the recesses and the finger contact slidably engages the corresponding recess contact;
further wherein at least one of the finger contact or the recess contact are hardened through a surface treatment.

11. The variable drive assembly of claim 10, wherein the surface treatment is one of austempering, quenching, tempering, case hardening, or laser hardening.

12. The variable drive assembly of claim 10, wherein the drive fingers and the recesses have an arc-shaped profile define about the drive shaft.

13. The variable drive assembly of claim 10, further comprises:
at least one bearing member defined by the movable sheave; and
at least one shaft contact defined along an outer surface of the drive shaft;
wherein the bearing member is defined by the movable sheave at a location adjacent to the shaft contact.

14. The variable drive assembly of claim 13, wherein the bearing member has a first axial length defined along the drive shaft and the shaft contact has a second axial length defined along the drive shaft, the second axial length being greater than the first axial length.

15. The variable drive assembly of claim 13, wherein the bearing member and the shaft contact are made of a material that is hardened through a surface treatment.

16. The variable drive assembly of claim 13, further comprising at least one seal positioned between the movable sheave and the drive shaft.

17. The variable drive assembly of claim 13, wherein the finger contact has an arc-shaped leading edge profile which engages a corresponding surface of the corresponding recess.

18. A variable drive comprising:
a fixed sheave fixed axially relative to the drive shaft and mounted for rotation with the drive shaft;
a movable sheave mounted for axial movement relative to the drive shaft;
a plurality of drive fingers projecting from one of the sheaves, each finger defining a finger contact with an arc-shaped profile; and
a plurality of recesses in the other sheave, each recess defining a recess contact with an arc-shaped profile;
wherein, each drive finger contact directly touches at least a portion of the corresponding recess contact.

19. The variable drive of claim 18, further wherein the arc-shaped profile of the finger contact and the arc-shaped profile of the recess contact correspond to contact one another when positioned adjacent thereto.

20. The variable drive of claim 18, further wherein the plurality of drive fingers includes no more than four drive fingers.

* * * * *